US011376701B2

(12) United States Patent
Kaniwa et al.

(10) Patent No.: US 11,376,701 B2
(45) Date of Patent: Jul. 5, 2022

(54) TOOL REPLACEMENT TIMING MANAGEMENT SYSTEM

(71) Applicant: FANUC CORPORATION, Yamanashi (JP)

(72) Inventors: Yukio Kaniwa, Yamanashi (JP); Nobuhiro Hara, Yamanashi (JP); Yuuki Ootsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 77 days.

(21) Appl. No.: 16/831,882

(22) Filed: Mar. 27, 2020

(65) Prior Publication Data
US 2020/0306913 A1 Oct. 1, 2020

(30) Foreign Application Priority Data

Mar. 28, 2019 (JP) .............................. JP2019-064269

(51) Int. Cl.
*B23Q 17/09* (2006.01)
*B23Q 17/10* (2006.01)

(52) U.S. Cl.
CPC ......... *B23Q 17/0995* (2013.01); *B23Q 17/10* (2013.01)

(58) Field of Classification Search
CPC ............................ B23Q 17/0995; B23Q 17/10
See application file for complete search history.

(56) References Cited

U.S. PATENT DOCUMENTS

| 11,017,305 | B2* | 5/2021 | Sadasivam | ............. G07C 5/085 |
| 2003/0182014 | A1* | 9/2003 | McDonnell | ........ G05B 19/4065 |
| | | | | 700/159 |
| 2013/0195143 | A1* | 8/2013 | Fukuta | ..................... G01K 7/02 |
| | | | | 374/179 |

FOREIGN PATENT DOCUMENTS

| JP | H7132440 | A | 5/1995 |
| JP | H11028646 | A | 2/1999 |
| JP | 2001205545 | A | 7/2001 |
| JP | 2004130451 | A | 4/2004 |
| JP | 2006205289 | A | 8/2006 |
| JP | 2008254080 | A | 10/2008 |
| JP | 4919999 | B2 | 4/2012 |
| JP | 5089618 | B2 | 12/2012 |
| JP | 2018103284 | A | 7/2018 |
| JP | 6392843 | B2 | 9/2018 |
| JP | 201930954 | A | 2/2019 |

* cited by examiner

*Primary Examiner* — Manuel L Barbee
(74) *Attorney, Agent, or Firm* — Hauptman Ham, LLP

(57) ABSTRACT

A tool replacement timing management system includes a data acquisition section configured to acquire time series data indicating a machining state from a machine, a data cutout section configured to cut out specimen data from the time series data according to at least one condition or a combination of conditions selected from among machining, a tool, a workpiece, and a tool speed, a machining state variable calculating section configured to calculate a machining state variable, which is a statistical index, from the specimen data, a tool deterioration state generation section configured to generate tool deterioration state data in which the machining state variable is aligned in a time series, and a tool replacement timing calculating section configured to calculate a tool replacement timing on a basis of the tool deterioration state data.

11 Claims, 9 Drawing Sheets

VARIANCE/STANDARD DEVIATION/RMS

KURTOSIS

KURTOSIS = 0
(NORMAL DISTRIBUTION)   KURTOSIS = POSITIVE   KURTOSIS = NEGATIVE

SKEWNESS

SKEWNESS = 0
(NORMAL DISTRIBUTION)

SKEWNESS = POSITIVE
(PEAK AT LEFT)

SKEWNESS = NEGATIVE
(PEAK AT RIGHT)

AVERAGE VALUE/MAXIMUM VALUE/MINIMUM VALUE

DISTANCE FROM REFERENCE WAVEFORM

INTEGRAL VALUE/AVERAGE LOAD/CUBIC MEAN VALUE

TOOL REPLACEMENT TIMING MANAGEMENT SYSTEM

RELATED APPLICATIONS

The present application claims priority of Japanese Application Number 2019-064269 filed Mar. 28, 2019, the disclosure of which is hereby incorporated by reference herein in its entirety.

BACKGROUND OF THE INVENTION

1. Field of the Invention

The present invention relates to a tool replacement timing management technique, and particularly relates to a tool replacement timing management system that quantitatively determines a tool replacement timing.

2. Description of the Related Art

As for techniques for managing a tool replacement timing in machines such as machine tools and robots, for example, the following documents are known.

JP 2001-205545 A discloses detecting a peak value of vibration along with rotation from a machine tool as operation state information, and referencing a determination criterion to determine a tool replacement timing.

JP 2018-103284 A discloses, from a machine tool, collecting machining information indicating a condition of machining in a state where a lifespan of a tool remains sufficiently, and making a machine learning apparatus learn the condition where the lifespan of the tool remains on a basis of the collected machining information.

JP 2004-130451 A discloses, by sequentially collecting, from a plurality of pieces of machining equipment provided with some tools, replacement timing information of each tool, and sequentially displaying the collected replacement timing information together with identification information of the pieces of machining equipment in a time series, in order to prevent equipment stopping due to a tool not replaced.

JP H11-28646 A discloses setting a fuzzy inference rule with a rotation speed of a main shaft on which a tool is mounted, a feed speed, and a main shaft drive torque as input variables, and a tool replacement timing as output variables, to determine the tool replacement timing by the fuzzy inference.

SUMMARY OF THE INVENTION

It is difficult to appropriately determine a tool replacement timing. The determination may be made on a basis of the number of machining times, a machining time, and the like, or a tool may be inspected daily, and replaced on a basis of appearance of the tool. In particular, a skilled person determines the tool replacement timing according to experience or intuition.

Thus, an object of the present invention is to provide a technique for quantitatively determining a tool replacement timing.

An aspect of the present disclosure provides a tool replacement timing management system that includes a data acquisition section configured to acquire time series data indicating a machining state from a machine, a data cutout section configured to cut out specimen data from the time series data according to at least one condition or a combination of conditions selected from among machining, a tool, a workpiece, and a tool speed, a machining state variable calculating section configured to calculate a machining state variable, which is a statistical index, from the specimen data, a tool deterioration state generation section configured to generate tool deterioration state data in which the machining state variable is aligned in a time series, and a tool replacement timing calculating section configured to calculate a tool replacement timing on a basis of the tool deterioration state data.

DETAILED DESCRIPTION

Figure 1:
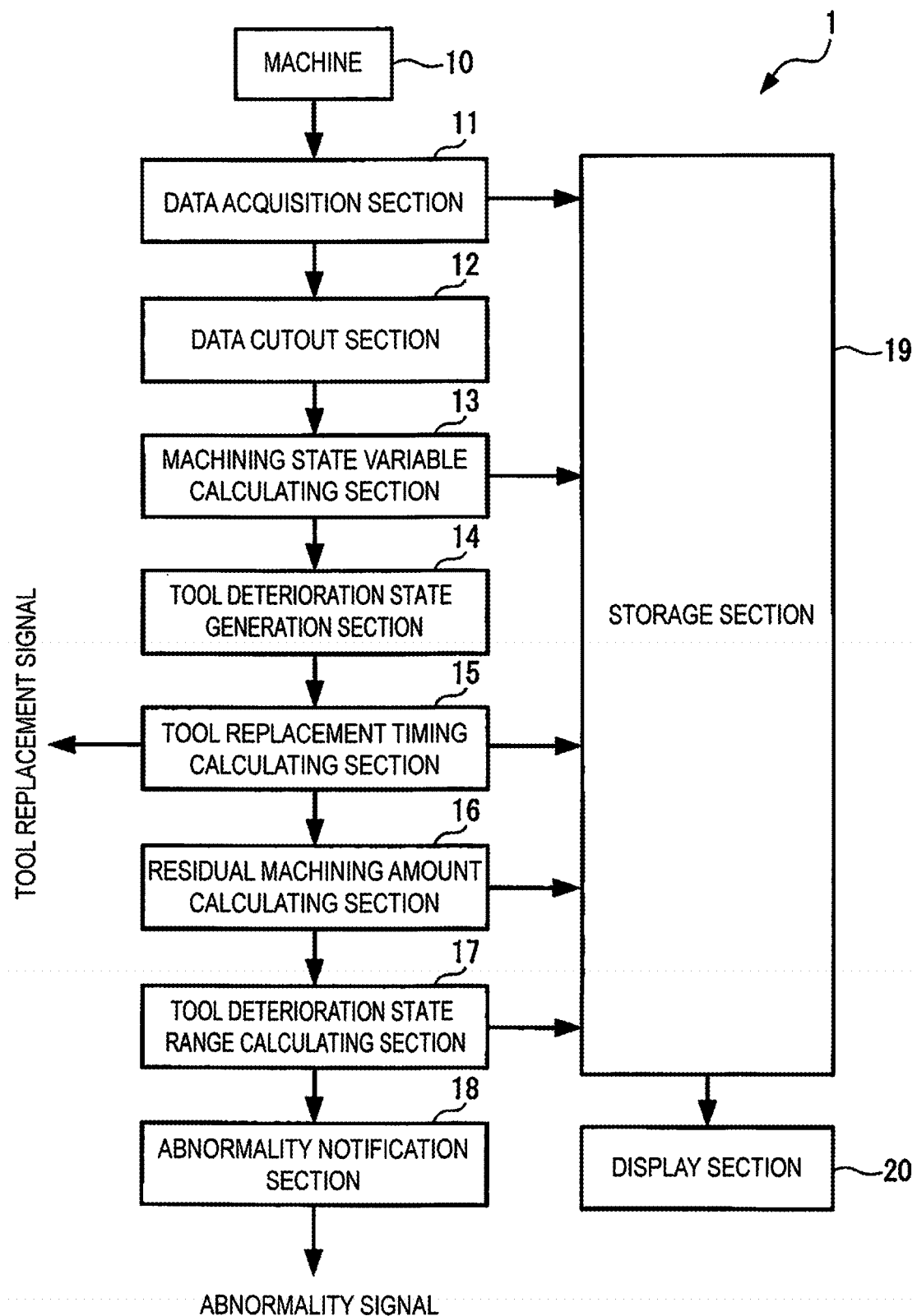
FIG. 1 is a block diagram of a tool replacement timing management system according to an embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

FIG. 1 is a block diagram of a tool replacement timing management system 1 in the present embodiment. The tool replacement timing management system 1 includes a machine 10, a data acquisition section 11, a data cutout section 12, a machining state variable calculating section 13, a tool deterioration state generation section 14, and a tool replacement timing calculating section 15. Constituent elements other than the machine 10 may be configured with hardware, such as an ASIC (application specific integrated circuit) and an FPGA (field-programmable gate array), or may be configured with software executed on a computer equipped with a CPU (central processing unit), a RAM (random access memory), a ROM (read only memory), and the like. Furthermore, the tool replacement timing management system 1 may be an all-in-one type in which the components are connected by bus connection or the like, or may be a distributed type in which the components are connected via a wired or wireless network.

The machine 10 is a machine that performs machining on a workpiece by using a tool, and includes, for example, a machine tool, a robot, or the like. Machining contents of the machine 10 include, for example, cutting-off, cutting, drilling, chamfering, threading, and the like, and types of the workpiece include, for example, metal, wood, and the like. Types of the tool include, for example, a milling cutter such as an end mill, a drill, a reamer, a tap, and the like.

Figure 2:
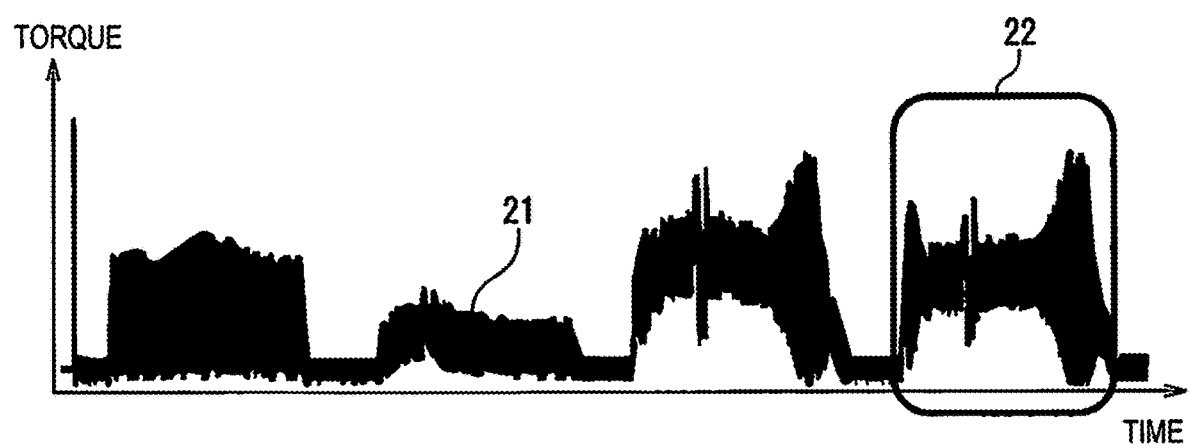
FIG. 2 is a diagram illustrating an example of time series data indicating a machining state.

The data acquisition section 11 acquires time series data indicating a machining state from the machine 10. The time series data indicating the machining state may be, for example, a torque value of a servo motor provided in the machine 10 (e.g., a torque command value, a current value, and the like of each shaft), a detected value of a sensor separately installed on the machine 10 (e.g., detected values of a vibration sensor, a force sensor, and the like), a machine parameter such as a tool offset, or the like. FIG. 2 illustrates time series data 21 of a torque value in one machining process, as an example of time series data indicating a machining state. In accordance with using a torque value or the like that can be acquired directly from the machine 10, an advantage is obtained that a separate sensor or the like needs not be provided on the machine 10.

Figure 3:
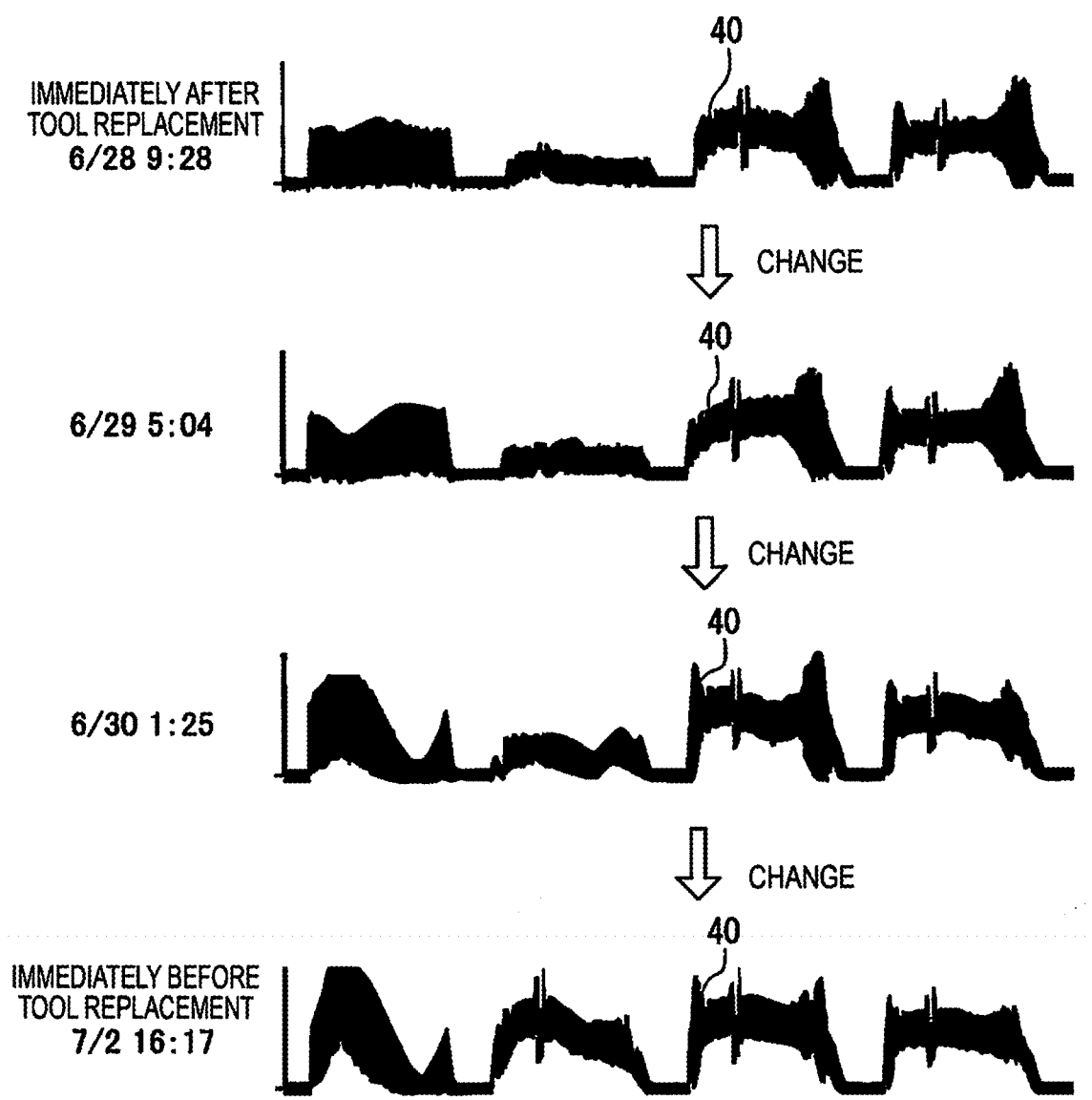
FIG. 3 is a diagram illustrating transition over time of time series data of a torque value in one machining process.

It can be seen that there is a change in a torque waveform over time when a change in the torque value or the like acquired from the machine 10 is viewed in a time series during machining, in a period from immediately after replacing a tool until next replacement of the tool. For example, FIG. 3 illustrates a change in time series data of a torque value 40 in one machining process over time. While regularity of the change over time is difficult to see in appearance, by using a particular index to make trends visible, a tool replacement timing can be predicted.

Analysis of the regularity of the change in the time series data of the torque value over time by using statistical indices such as variance, kurtosis, and the like, makes it possible to see that a change in the statistical index and a tool replacement timing interlock with each other, and both are related to each other.

The data cutout section 12 cuts out specimen data 22 from the time series data 21 indicating a machining state, according to at least one condition or a combination of conditions selected from among machining, a tool, a workpiece, and a tool speed. The combination of conditions for the cutout means that each of the machining, the tool, the workpiece, and the tool speed is identical, or that at least one of the machining, the tool, the workpiece, and the tool speed is similar. Similar machining includes machining that performs similar machining contents even for machining for another purpose (e.g., cutting-off and cutting, drilling and threading, etc.), or machining that performs partially different machining contents even for machining for an identical purpose (e.g., cutting including rough cutting and precision cutting, and cutting including only precision cutting, etc.). A similar tool or workpiece includes a tool or workpiece with identical features even when the tool or workpiece is supplied from another supplier. A similar tool speed includes a tool speed within a predetermined range. By constantly cutting out the specimen data 22 under identical conditions, a tool deterioration state can be viewed quantitatively when a machining state variable, which is a statistical index, is aligned in a time series.

The machining state variable calculating section 13 calculates a machining state variable, which is a statistical index, from the specimen data 22. The machining state variable includes, for example, variance, standard deviation, RMS, kurtosis, skewness, average value, maximum value, minimum value, distance from reference waveform (average waveform), integral value, average load, cubic mean value, and the like. The machining state variable may be a value for which a change over time is the largest among these statistical indices, or may be a value selected from among these statistical indices, or a combination thereof (e.g., a multiplication value or the like) on a basis of preset priority levels. The priority levels can be preset as three stages, for example, as illustrated in a table below.

| Machining State Variable | Priority Level (Three Stages) |
|---|---|
| Variance/Standard Deviation/RMS | 3 |
| Kurtosis | 2 |
| Skewness | 1 |
| Average Value | 2 |
| Maximum Value | 1 |
| Minimum Value | 1 |
| Distance from Reference Waveform | 3 |
| Integral Value | 2 |
| Average Load/Cubic Mean | 2 |

Figure 4:
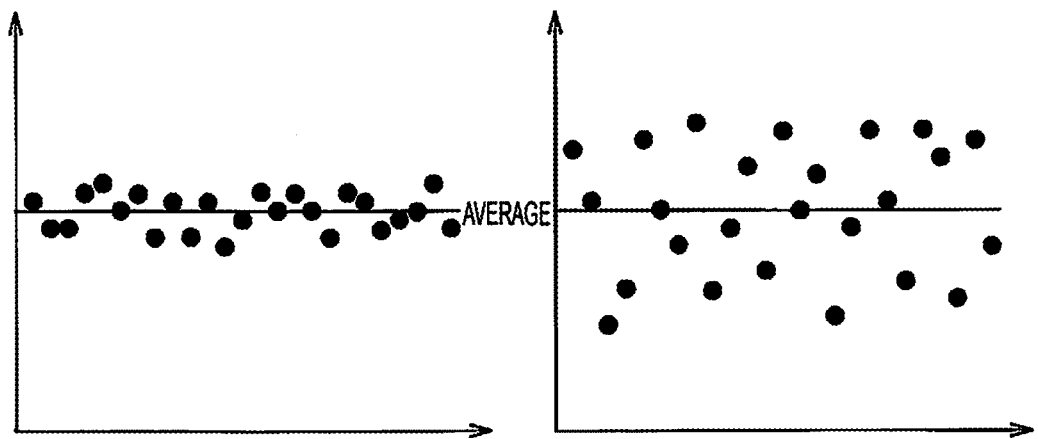
FIG. 4 is a conceptual diagram illustrating an example of a machining state variable (variance/standard deviation/root-mean-square (RMS)).

Variance/standard deviation/RMS, for example, as illustrated in FIG. 4, represent variations in the specimen data 22. When variance of the specimen data 22 is aligned in a time series from immediately after replacing a tool until before replacing the tool, the variance rises over time.

Figure 5:
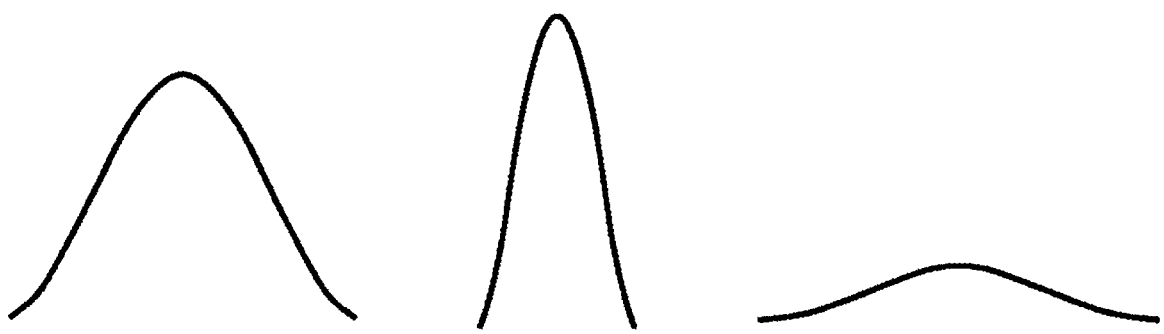
FIG. 5 is a conceptual diagram illustrating an example of the machining state variable (kurtosis).

Kurtosis, for example, as illustrated in FIG. 5, represents sharpness of the specimen data 22. When the kurtosis of the specimen data 22 is aligned in a time series from immediately after replacing a tool until before replacing the tool, the kurtosis lowers over time.

Figure 6:
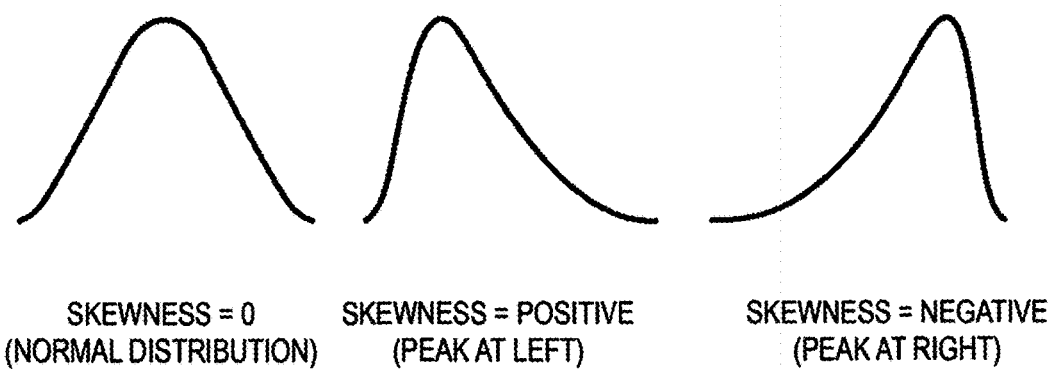
FIG. 6 is a conceptual diagram illustrating an example of the machining state variable (skewness).

Skewness, for example, as illustrated in FIG. 6, represents distortion of the specimen data 22. When the skewness of the specimen data 22 is aligned in a time series from immediately after replacing a tool until before replacing the tool, the skewness lowers over time as well.

Figure 7:
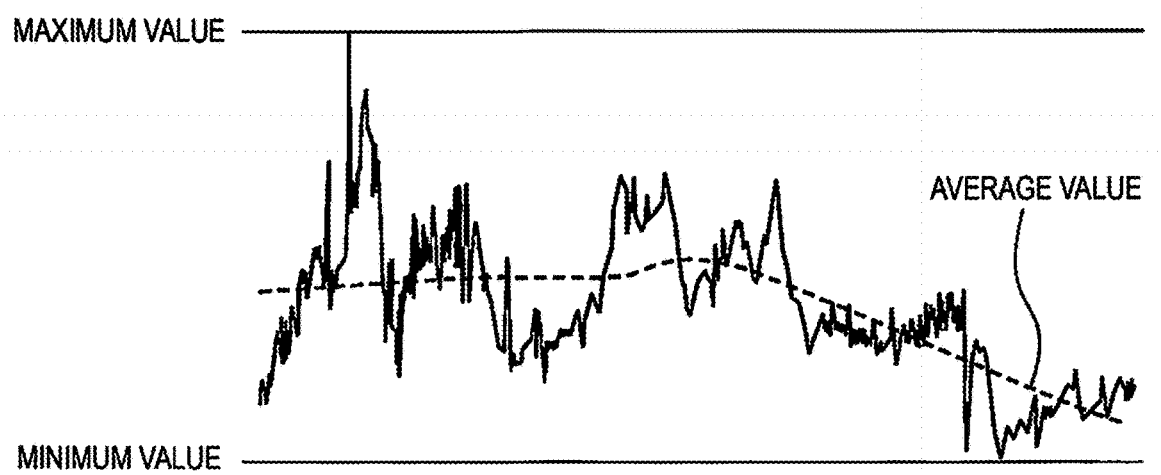
FIG. 7 is a conceptual diagram illustrating an example of the machining state variables (average value/maximum value/minimum value).

Average value/maximum value/minimum value are, for example, well known as illustrated in FIG. 7, however, when the average value/maximum value/minimum value of the specimen data 22 are aligned in a time series from immediately after replacing a tool and until before replacing the tool, these values also rise over time.

Figure 8:
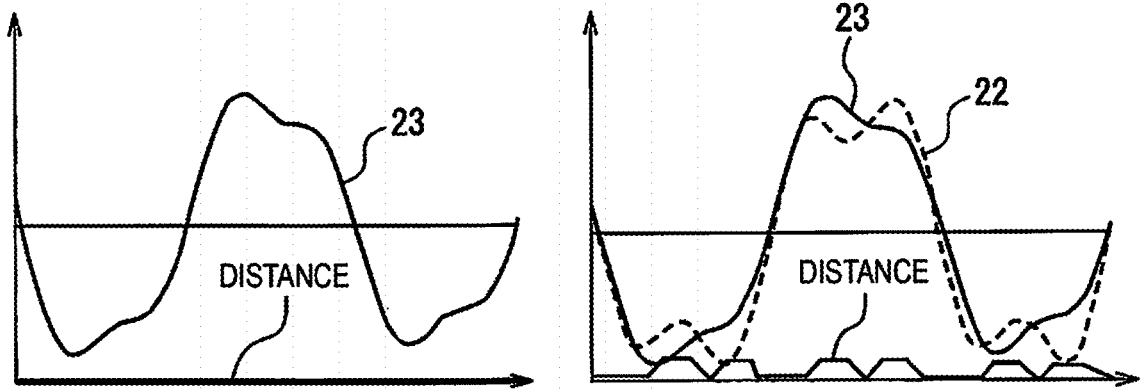
FIG. 8 is a conceptual diagram illustrating an example of the machining state variable (distance from reference waveform).

A distance from reference waveform (average waveform), for example, as illustrated in FIG. 8, represents a distance between the specimen data 22 and a reference waveform 23. The reference waveform may be an average waveform of the specimen data 22 in a past. When the distance from reference waveform to the specimen data 22 is aligned in a time series from immediately after replacing a tool until before replacing the tool, this value rises over time as well.

Figure 9:
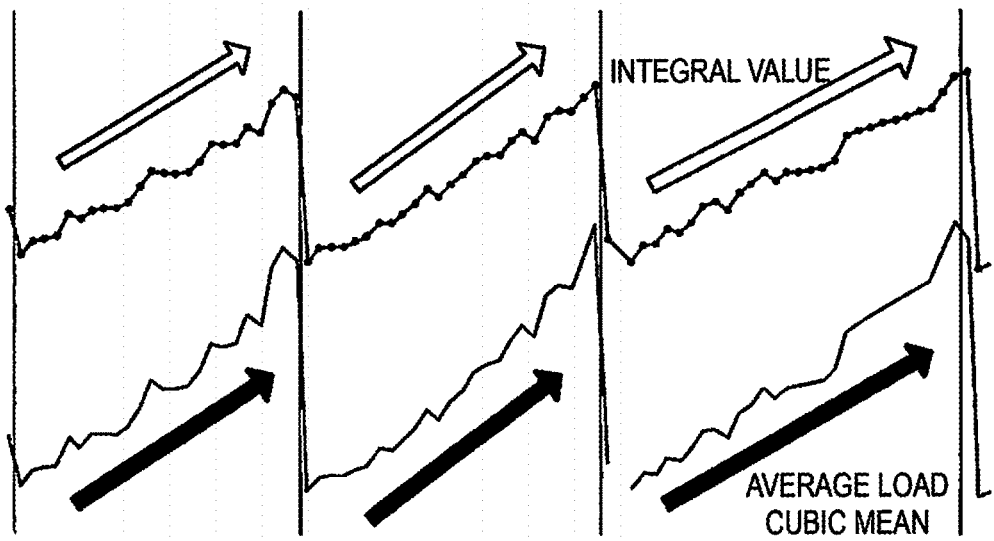
FIG. 9 is a conceptual diagram illustrating an example of the machining state variables (integral value/average load/cubic mean value).
Figure 10:
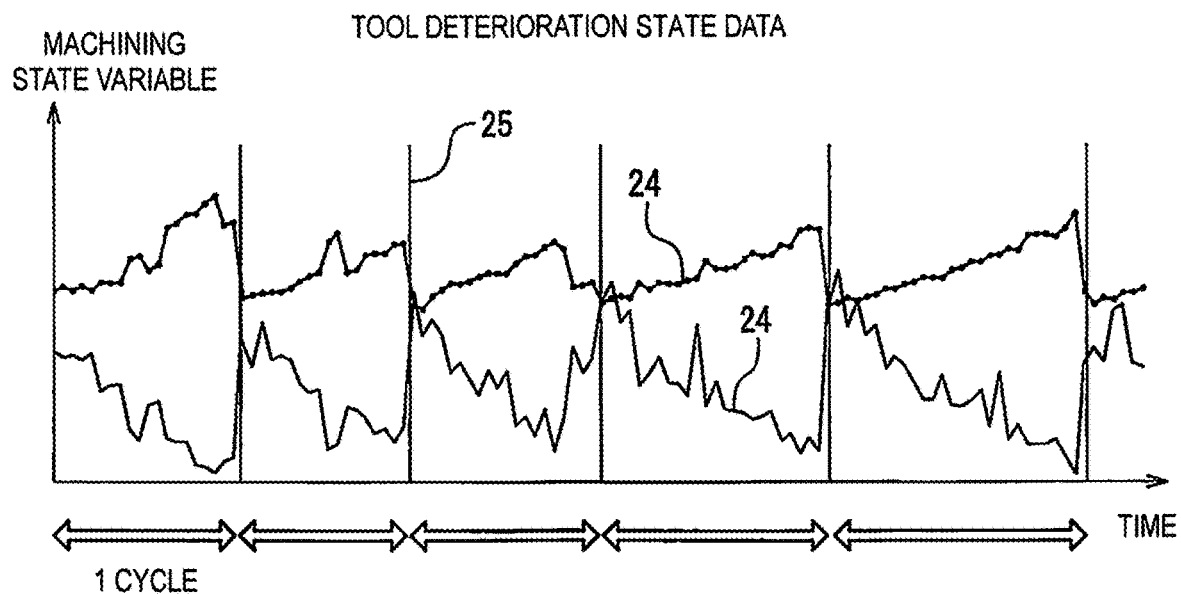
FIG. 10 is a diagram illustrating an example of tool deterioration state data.

An integral value, for example, as illustrated in FIG. 9, represents a total integral value (cumulative value) of the specimen data 22. When the integral value of the specimen data 22 is aligned in a time series from immediately after replacing a tool until before replacing the tool, this value rises over time as well.

An average load $F_m$ is determined from a formula below, for example, where $F_n$ is a load at time $t_n$, and n is a speed at time $t_n$. However, since the specimen data 22 are cut out under identical or similar tool speed condition, the speed n is fixed (i.e., a constant) or falls within a certain range.

$$F_m = \sqrt{\frac{F_1 nt_1 + F_2 nt_2 + \ldots + F_n nt_n}{nt_1 + nt_2 + \ldots + nt_n}}$$

A cubic mean value is a cubic mean of deviations from an average value, as is well known. When average load/cubic mean value of the specimen data 22 are aligned in a time series from immediately after replacing a tool until before replacing the tool, these values rise over time as well.

Referring again to FIG. 1, the tool deterioration state generation section 14 generates tool deterioration state data in which the machining state variable is aligned in a time series, with a period from after replacing a tool until before replacing the tool being one cycle. FIG. 9 illustrates tool deterioration state data 24 in which the variance (a top graph) and the kurtosis (a bottom graph) are aligned in a time series. At an end of each cycle, an actual tool replacement timing 25 is illustrated. It can be seen that, as the tool replacement timing 25 is approached, the variance rises and the kurtosis lowers. By accumulating the tool replacement timing 25 of a reliable skilled person, a more appropriate tool replacement timing can be predicted.

Figure 11:
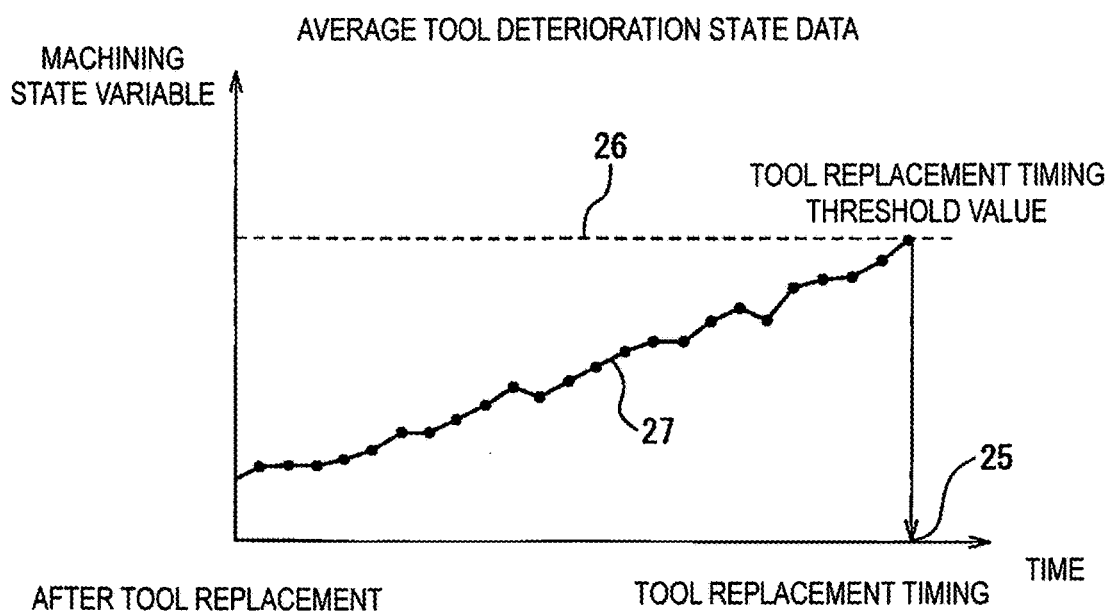
FIG. 11 is a diagram illustrating an example of a tool replacement timing threshold value.

Referring again to FIG. 1, the tool replacement timing calculating section 15 calculates the tool replacement timing on a basis of the tool deterioration state data. For example, the tool replacement timing calculating section 15 may calculate a tool replacement timing threshold value on a basis of the tool deterioration state data previously generated as illustrated in FIG. 11, and calculate a tool replacement timing in tool deterioration state data newly generated. Furthermore, in order to calculate a more appropriate tool replacement timing threshold value, the tool replacement timing calculating section 15 desirably calculates a tool replacement timing threshold value on a basis of tool deterioration state data of a specific worker (e.g., a reliable skilled person).

Examples of a method for calculating the tool replacement timing threshold value include, for example, techniques below.

(1) A maximum value of a machining state variable in one cycle is calculated as an average value averaged over a plurality of cycles.

(2) A machining state variable immediately before a change in the machining state variable in one cycle is maximized is calculated as an average value averaged over a plurality of cycles.

(3) An average value of a machining state variable at an identical time point over a plurality of cycles is calculated, as a maximum value in average tool deterioration state data aligned in a time series.

FIG. 11 illustrates an example of a tool replacement timing threshold value 26. This tool replacement timing threshold value 26 is calculated as a maximum value in average tool deterioration state data 27. The tool replacement timing calculating section 15 calculates a time point when newly generated tool deterioration state data exceed the tool replacement timing threshold value 26, as the tool replacement timing 25.

When the newly generated tool deterioration state data exceed the tool replacement timing threshold value 26, the tool replacement timing calculating section 15, for example, as illustrated in FIG. 1, may output a tool replacement signal to the machine 10. The tool replacement signal can be utilized, for example, as an automatic tool replacement signal for the machine 10, or as a tool replacement notification signal for a worker.

Figure 12:
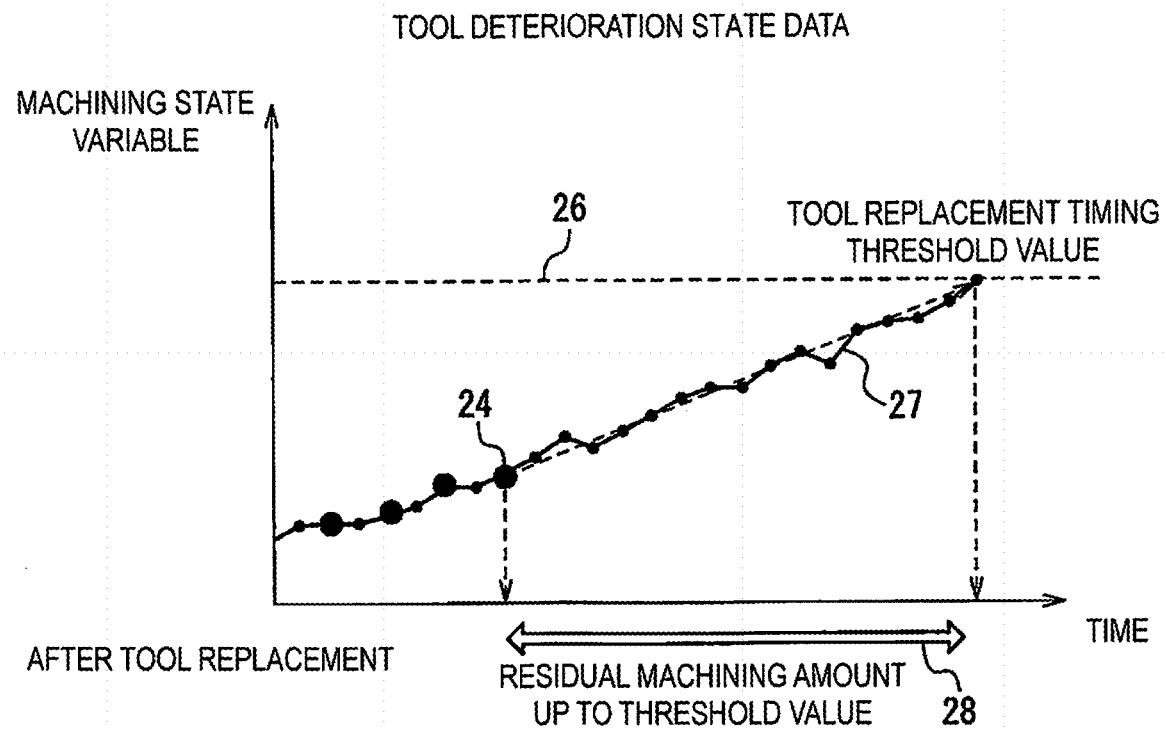
FIG. 12 is a diagram illustrating an example of a residual machining amount.

The tool replacement timing management system 1 may further include a residual machining amount calculating section 16. For example, as illustrated in FIG. 12, the residual machining amount calculating section 16 calculates a residual machining amount 28 on a basis of the tool deterioration state data 24 newly generated and the tool replacement timing threshold value 26. The residual machining amount may be, for example, the number of residual machining times, a residual machining time, and the like.

Examples of a method for calculating the residual machining amount include, for example, techniques below.

(1) A predicted approximate line of the tool deterioration state data 24 newly generated is determined, an intersection point of the predicted approximate line and the tool replacement timing threshold value 26 is calculated, and the residual machining amount 28 from current to the intersection point is calculated.

(2) An intersection point of the average tool deterioration state data 27 and the tool replacement timing threshold value 26 is calculated, and the residual machining amount 28 from current to the intersection point is calculated.

Figure 13:
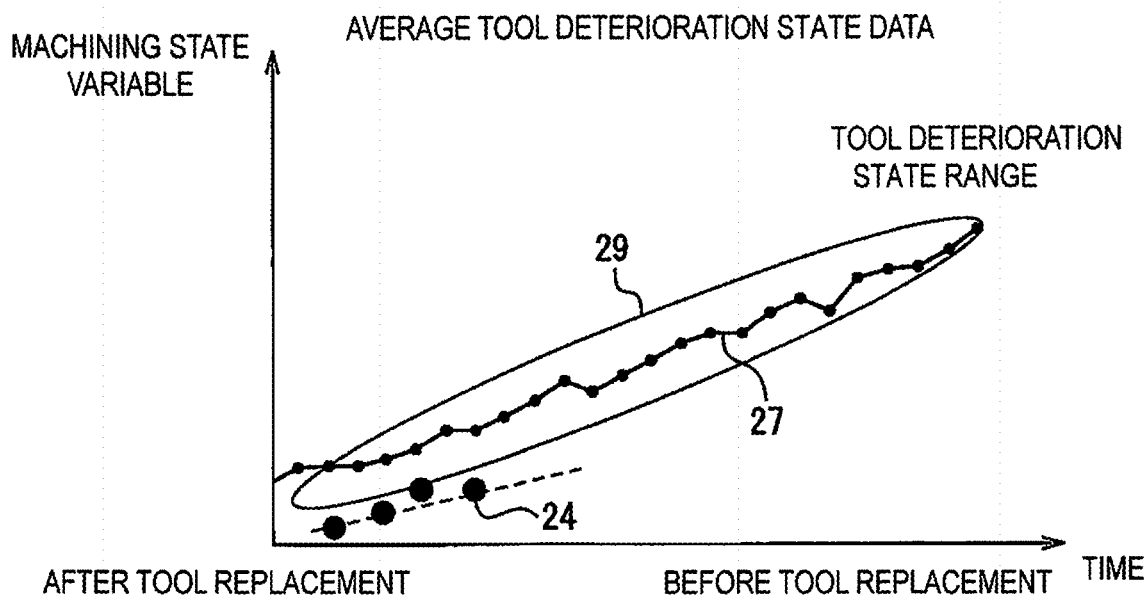
FIG. 13 is a diagram illustrating an example of a tool deterioration state range.

Referring again to FIG. 1, the tool replacement timing management system 1 may further include a tool deterioration state range calculating section 17, and an abnormality notification section 18. The tool deterioration state range calculating section 17, for example, calculates the average tool deterioration state data 27 as illustrated in FIG. 13, and standard deviation tool deterioration state data (not illustrated) in which a standard deviation of a machining state variable at an identical time point over a plurality of cycles is aligned in a time series, and calculates a range obtained by adding and subtracting a predetermined multiple of the standard deviation tool deterioration state data to and from the average tool deterioration state data 27 as a tool deterioration state range 29. When a standard deviation is a, the tool deterioration state data 24 newly generated are to fall within the tool deterioration state range 29 of ±1σ with a probability of 68%, fall within the tool deterioration state range 29 of ±2σ with a probability of 95%, and fall within the tool deterioration state range 29 of ±3σ with a probability of 99%.

When the tool deterioration state data 24 newly generated deviate from the tool deterioration state range 29, the abnormality notification section 18 outputs an abnormality signal. The abnormality signal can be utilized, for example, as a power stop signal for the machine 10, or as a tool check notification signal for the worker.

The tool replacement timing management system 1 may further include a storage section 19 and a display section 20. The storage section 19 includes, for example, memories such as a RAM (random access memory) and an SSD (solid state drive). The storage section 19 stores, for each of machining contents, types of workpiece, and types of tool, for example, time series data indicating a machining state, newly generated tool deterioration state data, a tool replacement timing threshold value, average tool deterioration state data, a residual machining amount, and the like.

Figure 14:
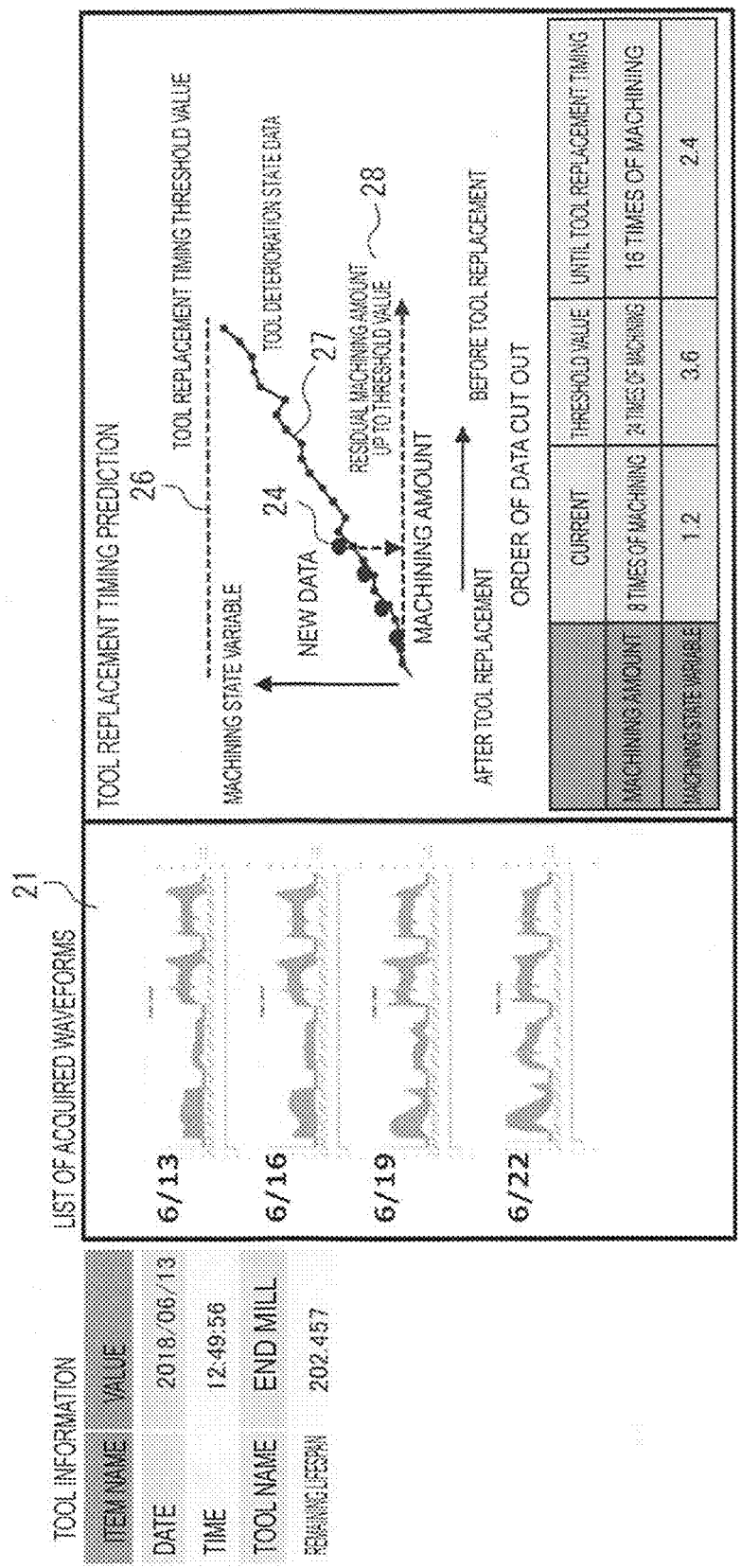
FIG. 14 is a diagram illustrating an example of a display screen of a display section.

The display section 20, for example, includes a display apparatus such as a liquid crystal display. The display section 20, for example, as illustrated in FIG. 14, for each of machining contents, types of workpiece, and types of tool, displays the time series data 21 indicating a machining state, the tool deterioration state data 24 newly generated, the tool replacement timing threshold value 26, the average tool deterioration state data 27, the residual machining amount 28, and the like. This makes it possible to quantitatively view a tool deterioration state, an appropriate tool replacement timing, a residual machining amount, and the like.

According to the present embodiment, by aligning the machining state variable, which is a statistical index, in a time series, the tool deterioration state can be viewed quantitatively. In addition, accumulation of a tool replacement timing of a skilled person makes it possible to predict an appropriate tool replacement timing as well. Further, an appropriate tool replacement timing can be taught to an unskilled person.

The above-described programs, software, and the like can be recorded on a computer readable non-temporary recording medium, for example, a CD-ROM, or the like, and provided.

Although some embodiments are described in this specification, the present invention is not limited to the above-described embodiments, and it is to be understood that various changes can be made without departing from the scope of the appended claims.

The invention claimed is:

1. A tool replacement timing management system, comprising:
    a data acquisition section configured to acquire time series data indicating a machining state from a machine;
    a data cutout section configured to cut out specimen data from the time series data according to at least one condition or a combination of conditions selected from among machining, a tool, a workpiece, and a tool speed;
    a machining state variable calculating section configured to calculate a machining state variable, which is a statistical index, from the specimen data;
    a tool deterioration state generation section configured to generate tool deterioration state data in which the machining state variable is aligned in a time series; and
    a tool replacement timing calculating section configured to calculate a tool replacement timing on a basis of the tool deterioration state data.

2. The tool replacement timing management system of claim 1, wherein the combination of conditions includes that each of the machining, the tool, the workpiece, and the tool speed is identical, or that at least one of the machining, the tool, the workpiece, and the tool speed is similar.

3. The tool replacement timing management system of claim 1, wherein the tool deterioration state data are obtained by aligning the machining state variable in a time series, with a period from after replacing the tool until before replacing a tool being one cycle.

4. The tool replacement timing management system of claim 3, wherein the tool replacement timing calculating section calculates a tool replacement timing threshold value on a basis of the tool deterioration state data previously generated, and calculates the tool replacement timing in the tool deterioration state data newly generated.

5. The tool replacement timing management system of claim 4, wherein the tool replacement timing threshold value is an average value obtained by averaging a maximum value of the machining state variable in one cycle over a plurality of cycles, or an average value obtained by averaging the machining state variable immediately before a change in the machining state variable in one cycle is maximized over a plurality of cycles, or a maximum value in average tool deterioration state data in which an average value of the machining state variable at an identical time point over a plurality of cycles is aligned in a time series.

6. The tool replacement timing management system of claim 4, wherein the tool replacement timing calculating section calculates the tool replacement timing threshold value on a basis of the tool deterioration state data of a specific worker.

7. The tool replacement timing management system of claim 4, further comprising a residual machining amount calculating section configured to calculate a residual machining amount on a basis of the tool deterioration state data newly generated and the tool replacement timing threshold value.

8. The tool replacement timing management system of claim 4, further comprising:
    a tool deterioration state range calculating section configured to calculate average tool deterioration state data in which an average value of the machining state variable at an identical time point over a plurality of cycles is aligned in a time series, and standard deviation tool deterioration state data in which a standard deviation of the machining state variable at an identical time point over a plurality of cycles is aligned in a time series, to calculate a range obtained by adding and subtracting a predetermined multiple of the standard deviation tool deterioration state data to and from the average tool deterioration state data as a tool deterioration state range; and
    an abnormality notification section configured to notify of an abnormality when the tool deterioration state data newly generated deviate from the tool deterioration state range.

9. The tool replacement timing management system of claim 4, further comprising a display section configured to display at least one of
    the time series data indicating the machining state,
    the tool deterioration state data,
    the tool replacement timing threshold value calculated on a basis of the tool deterioration state data previously generated,
    average tool deterioration state data in which an average value of the machining state variable at an identical time point over a plurality of cycles is aligned in a time series, and
    a residual machining amount calculated on a basis of the tool deterioration state data newly generated and the tool replacement timing threshold value.

10. The tool replacement timing management system of claim 1, wherein the machining state variable is a value or combination selected from among variance, standard deviation, root mean square, kurtosis, skewness, average value, maximum value, minimum value, distance from reference waveform, integral value, average load, and cubic mean value on a basis of a preset priority level.

11. The tool replacement timing management system of claim 1, wherein the machining state variable is a value, for which a change over time is the largest, among variance, standard deviation, root mean square, kurtosis, skewness, average value, maximum value, minimum value, distance from reference waveform, integral value, average load, and cubic mean value.

* * * * *